(12) United States Patent
Fusegi

(10) Patent No.: US 7,325,664 B2
(45) Date of Patent: Feb. 5, 2008

(54) ELECTROMAGNETIC ACTUATOR, AND ELECTROMAGNETIC CLUTCH AND DIFFERENTIAL USING THE SAME

(75) Inventor: Masaaki Fusegi, Tochigi-ken (JP)

(73) Assignee: Tochigi Fuji Sangyo Kabushiki Kaisha, Tochigi-shi (JP)

(*) Notice: Subject to any disclaimer, the term of this patent is extended or adjusted under 35 U.S.C. 154(b) by 155 days.

(21) Appl. No.: 11/154,391

(22) Filed: Jun. 15, 2005

(65) Prior Publication Data

US 2005/0279607 A1 Dec. 22, 2005

(30) Foreign Application Priority Data

Jun. 16, 2004 (JP) ............................ 2004-178493

(51) Int. Cl.
*F16D 27/108* (2006.01)
*F16H 48/24* (2006.01)

(52) U.S. Cl. .................... 192/84.92; 475/150; 475/231

(58) Field of Classification Search ............. 192/84.92
See application file for complete search history.

(56) References Cited

U.S. PATENT DOCUMENTS

| | | | | |
|---|---|---|---|---|
| 2,962,141 A | * | 11/1960 | Rudisch | 192/84.91 |
| 6,208,497 B1 | * | 3/2001 | Seale et al. | 361/160 |
| 6,668,996 B2 | * | 12/2003 | Nekado et al. | 192/84.91 |
| 6,958,030 B2 | * | 10/2005 | DeGowske | 475/231 |
| 2003/0162622 A1 | * | 8/2003 | Fusegi et al. | 475/231 |
| 2004/0132572 A1 | * | 7/2004 | Ludwig et al. | 475/150 |

FOREIGN PATENT DOCUMENTS

| | | |
|---|---|---|
| DE | 4227535 | 3/1993 |
| DE | 19607768 | 9/1997 |
| DE | 19858026 | 7/1999 |
| DE | 10040207 | 4/2001 |
| DE | 10203640 | 8/2002 |
| JP | 04-312217 A | 11/1992 |
| JP | 11-186031 A | 7/1999 |
| WO | WO-95/24571 | 9/1995 |

* cited by examiner

*Primary Examiner*—Rodney H. Bonck
(74) *Attorney, Agent, or Firm*—Morrison & Foerster LLP

(57) ABSTRACT

The electromagnetic actuator includes an electromagnetic coil configured to provide actuation force in accordance with a solenoid current to be supplied, to a clutch and configured to actuate the clutch to control relative rotation between first and second members. The electromagnetic actuator includes a detector configured to detect the clutch actuated to produce a detection signal. The electromagnetic actuator includes a controller configured to respond to the detection signal from the detector to control the solenoid current.

11 Claims, 5 Drawing Sheets

ELECTROMAGNETIC ACTUATOR, AND ELECTROMAGNETIC CLUTCH AND DIFFERENTIAL USING THE SAME

CROSS-REFERENCE TO RELATED APPLICATIONS

This application is based upon and claims the benefit of priority from Japanese Patent Application No. 2004-178493 filed on Jun. 16, 2004; the entire contents of which are incorporated herein by reference.

BACKGROUND OF THE INVENTION

1. Field of the Invention

The invention relates to an electromagnetic actuator for locking or releasing relative rotation between relative rotation members and an electromagnetic clutch using the same, and, specifically, a differential using the electromagnetic clutch.

2. Description of Relevant Art

The patent application publication laid-open No.Hei11-186031 as a relevant document describes "a method of actuating a solenoid and an actuator".

When a general electromagnetic actuator actuates, for example, an engagement clutch (clutch system), firstly a large solenoid current is supplied to an electromagnetic solenoid. This allows the electromagnet to be excited, thus engaging the engagement clutch. Thereafter, the solenoid current is reduced to a hold current that is sufficient to hold the clutch engaged.

The following is objectives for supplying the excitation current when the engagement clutch engages. The first objective is to provide a large actuation force to the engagement clutch for secure engagement without enlarging the electromagnetic solenoid. The second objective is, thereafter, to reduce the solenoid current to the hold current, thus reducing power consumption and heat generation.

According to the solenoid actuating method in the relevant document, based on the excitation current (Ia, Ib) measured at at least two time points (Ta, Tb) during the excitation, completion time points (Tg) are predicted that the excitation current reaches a predetermined value. At the predicted time point (Tg), the excitation current is switched to the hold current. This establishes timing to switch the solenoid current to the hold current.

Thus, according to the solenoid driving method in the relevant document with a system that predicts the completion time point when the excitation current reaches a predetermined value, if it takes time for the engagement clutch to practically engage more than predicted, the solenoid current is reduced to the hold current before the engagement clutch engages. This prediction causes a shortage of the actuation force, thus failing to engage the engagement clutch.

For preventing the shortage of the actuation force, however, the electromagnetic solenoid requires normal supplying of the excitation current, which increases current consumption and heat generation.

For normal supplying of the excitation current to the electromagnetic solenoid to reduce the solenoid current (or excitation current), the electromagnetic solenoid is required to be larger. This renders the system larger, and deteriorates the layout and vehicle mountability.

SUMMARY OF THE INVENTION

The invention is directed to an electromagnetic actuator, and an electromagnetic clutch and a differential using the same that securely actuate the clutch system and suppress power consumption and heat generation, thus preventing the system from being enlarged. This electromagnetic clutch actuator actuates the clutch system for limiting differential under actuation force due to the electromagnet, and a detector precisely detects the substance of actuation in the clutch system.

According to the main principle of the aspects of the invention, when the detector detects the clutch actuated (or detects substance of switching), the controller controls the solenoid current. The constitution precisely judges the clutch actuated, differently from the relevant example that predicts switching without detecting the substance of switching. Thus, before the clutch practically actuates, the controller prevents the error that the solenoid current is reduced to the hold current, which prevents incapability of actuation in the clutch from due to the shortage of actuation force.

For preventing shortage of the actuation force, the excitation current does not need to keep being supplied to the electromagnetic coil. This prevents current consumption and heat generation from increasing and does not need normal supplying of excitation current. This prevents the electromagnet and system using the same from being enlarged to reduce solenoid current (or excitation current), thus preventing layout and vehicle mountability from being deteriorated.

The excitation current is applied to the electromagnetic coil when the clutch is actuated, and, thereafter, is reduced to the hold current at a necessary timing. This allows for setting to a higher excitation current, thus allowing for a smaller and lighter electromagnet.

Therefore, as each aspect of the invention, the first aspect of the invention provides the following electromagnetic actuator. The electromagnetic actuator includes an electromagnet coil configured to provide actuation force in accordance with a solenoid current to be supplied, to a clutch and configured to actuate the clutch to control relative rotation between first and second members. The electromagnetic actuator includes a detector configured to detect the clutch actuated to produce a detection signal. The electromagnetic actuator includes a controller configured to respond to the detection signal from the detector to control the solenoid current.

The first and second members may include, for example, combinations of a pair of side gears, a pinion gear and a side gear, a side gear and an input member, and a pinion gear and an input member, when applied to a vehicle differential.

The input member may include, for example, a ring gear and a differential housing.

The first and second members may include another member to rotate with the first and second members used for the combinations, in view of design.

The electromagnetic actuator further includes an actuation member movable by the electromagnetic coil to actuate the clutch. The detector includes a position switch to detect the actuation member moved to actuate the clutch.

The "actuation member" corresponds to one of members existing on the actuation path between the electromagnetic coil and the clutch member for actuating the clutch in the embodiment. Where a plurality of members serially applies actuation force, the actuation member may correspond to one of members. The actuation member corresponds to, for example, either of a coil housing, a plunger, a pressure plate or a clutch ring.

The electromagnetic actuator further includes a resilient member configured to return the actuation member to an original position.

After the solenoid current is supplied to the electromagnetic coil, the controller is delayed for a predetermined time from detection of substance of switching in the clutch by the detector to reduce the solenoid current to a hold current.

The second aspect of the invention provides the following differential. The differential includes first and second members rotatable relative to each other. The differential includes a clutch engageable to connect the first and second members. The differential includes an electromagnetic actuator configured to actuate the clutch. The electromagnetic actuator includes an electromagnet configured to be excited into a first state to actuate the clutch and a second state to hold the clutch actuated. The electromagnetic actuator includes a detector configured to detect the clutch actuated. The electromagnetic clutch includes a controller configured to respond to the detector detecting the clutch actuated by changing the electromagnet from the first state to the second state.

The third aspect of the invention provides an electromagnetic clutch. The electromagnetic clutch includes a clutch engageable to connect a first member and a second member rotatable relative to each other. The electromagnetic clutch includes an electromagnetic actuator configured to actuate the clutch. The electromagnetic actuator includes an electromagnet configured to be excited into a first state to actuate the clutch and a second state to hold the clutch actuated. The electromagnetic actuator includes a detector configured to detect the clutch actuated. The electromagnetic actuator includes a controller configured to respond to the detector detecting the clutch actuated by changing the electromagnet from the first state to the second state.

The fourth aspect of the invention provides an electromagnetic actuator. The electromagnetic actuator includes an electromagnet configured to be excited into a first state to actuate a clutch and a second state to hold the clutch actuated for controlling a relative rotation between first member and a second member. The electromagnetic actuator includes a detector configured to detect the clutch actuated. The electromagnetic actuator includes a controller configured to respond to the detector detecting the clutch actuated by changing the electromagnet from the first state to the second state.

The clutch may include a clutch member connected to one of the first and second members and movable by the electromagnet between a first position and a second position. The clutch member disengages the clutch at the first position and engages the clutch at the second position. When the detector detects the clutch member moved between the first and second positions to provide a detection signal, the controller responds to the detection signal by changing the electromagnet from the first state to the second state.

The detector may measure position of the clutch member.

The controller may be delayed for a predetermined time from detection of the clutch actuated by the detector to change the electromagnet from the first state to the second state.

The first and second members may include first and second differential rotation members for a vehicle differential. The clutch controls differential rotation between the first and second differential rotation members.

BRIEF DESCRIPTION OF THE ACCOMPANYING DRAWINGS

DETAILED DESCRIPTION OF THE PREFERRED EMBODIMENTS

An embodiment of the invention will hereby be described as the following with reference to FIGS. 1 to 5.

An electromagnetic actuator 1 (or an embodiment of the invention), and an electromagnetic clutch and a differential 3 employing the electromagnetic actuator 1. In the following description, the left and right direction indicates the left and right direction of a vehicle employing the differential 3 or in FIG. 1.

The electromagnetic actuator 1 is described.

Figure 1:
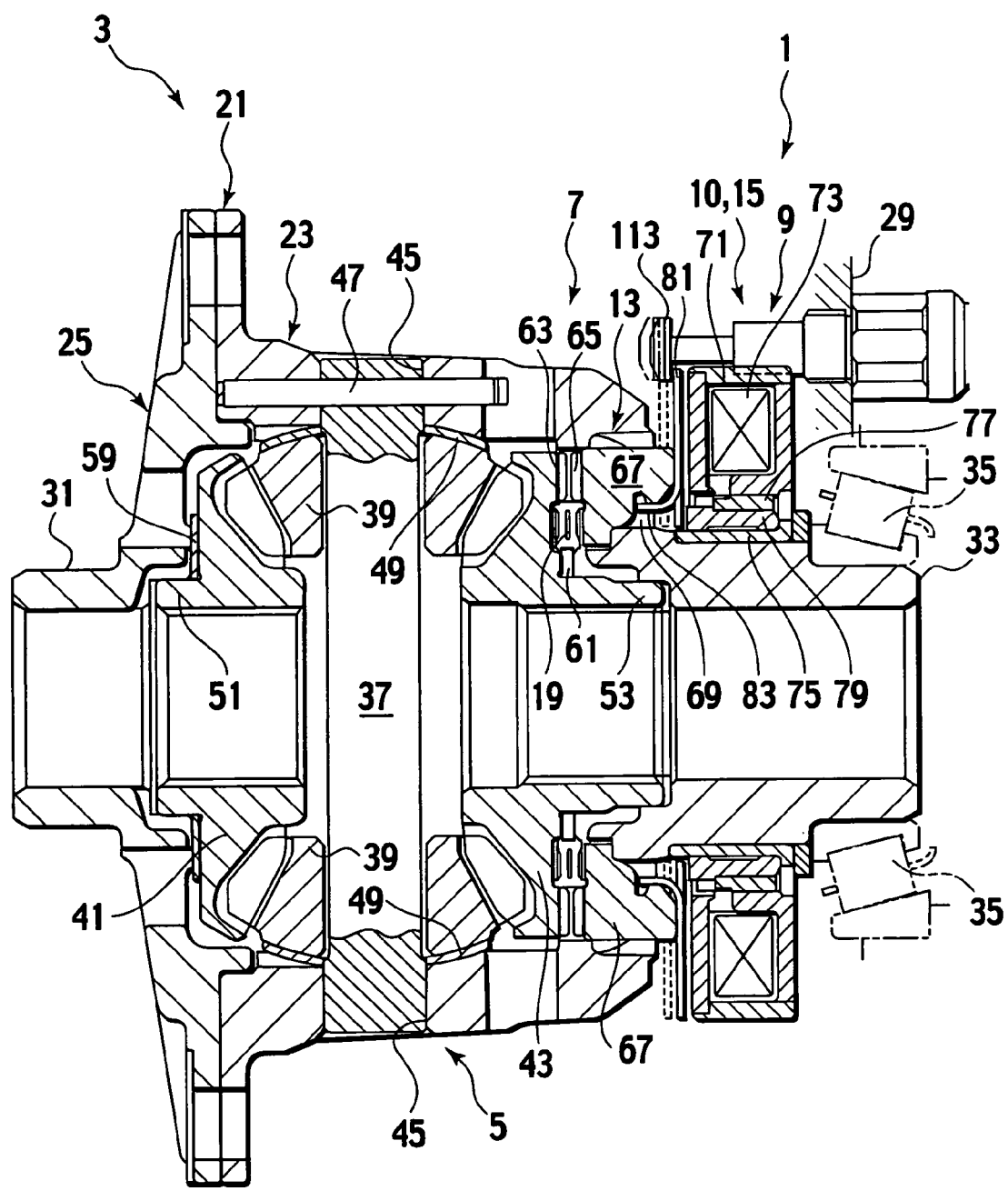
FIG. 1 is a sectional view of a differential using an electromagnetic actuator according to an embodiment.

With reference to FIG. 1, the electromagnetic actuator includes a differential-lock electromagnet 9 (referred to as an electromagnet) that provides actuation force according to a solenoid current to a dog clutch 7 as a clutch for actuation that locks differential mechanism 5 with differential rotation.

The differential mechanism 5 adopts a bevel gear mechanism as one means. The electromagnetic actuator 1 includes a detector 10 that detects the dog clutch 7 actuated to generate a detection signal (or detects substance of switching in the clutch 7; refer to FIG. 3).

Figure 3:
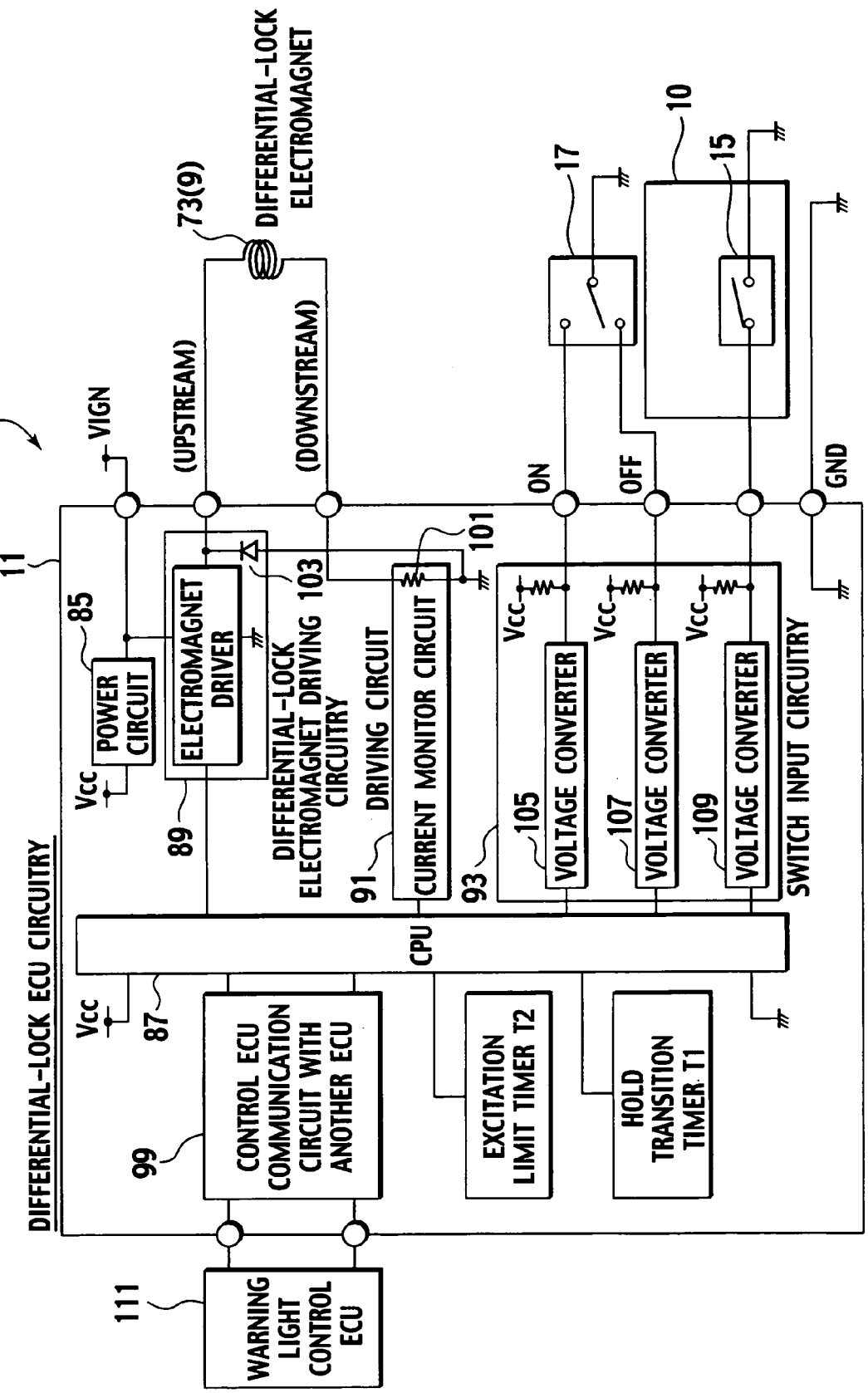
FIG. 3 is a block diagram of circuitry constitution of a differential-lock ECU applied to the differential in FIG. 1.

The electromagnetic actuator 1 includes a differential-lock ECU 11 that controls a current to be supplied to the electromagnet 9 in response to the detection signal from the detector 10 (referred to as an ECU; a controller; refer to FIG. 3).

The detector 10 includes a differential-lock position switch 15 (hereinafter referred to as a position switch) that detects the clutch ring 13 or an actuation member for the dog clutch 7 moving to the engagement position (or the actuation position). This is characterized in that after a solenoid current is supplied to the electromagnet 9, the ECU 11 sets a predetermined time (t1) from detection of the substance of switching the dog clutch 7 to reduction of the solenoid current to the hold current.

The "substance of switching" is, for example, a substantial movement position of the clutch ring 13 or a position movement of the pressure plate 81 as a member that is axially moved by the clutch ring 13. A relationship between displacement of the clutch ring 13 and engagement or disengagement of the clutch 7 is obtained with the assembly. The substantial switching of the clutch 7 is understood based on the actuation position of the clutch ring 13 with reference to the relationship.

The "hold current" is current of a magnitude that holds engagement of the dog clutch 7 against the return spring 19.

The structure of differential 3 is described.

With reference to FIG. 1, the differential 3 includes the electromagnetic actuator 1, the differential mechanism 5, the dog clutch 7, a return spring 19, differential casing 21, and a controller having the following various ECUs (electric control unit) integrated therewith.

The differential casing 21 includes a casing body 23 and a left cover 25 secured each other using a bolt 27. The differential casing 21 is located inside a differential carrier 29 formed with an oil reservoir and served as one of stationary members having the position switch 15 as the detector 10 fixed thereto. The differential casing 21 has openings 46 therethrough for lubrication oil to circulate between the inside and outside of the differential casing 21.

The differential mechanism 5 includes pinion shafts 37 fixed to the differential casing 21. The differential mechanism 5 includes pinion gears 39 rotatably supported to each of the pinion shafts 37, respectively. The differential mechanism 5 includes output side gears 41 and 43 engaging with the pinion gears 39 from the left and right, respectively.

Each of the pinion shafts 37 has an end engaging with a through-hole 45 provided to the differential casing 21 (casing body 23). This end is stopped from coming off by the spring pin 47. The differential casing 21 and each of the pinion gears 39 include spherical washers 49 located therebetween. The spherical washers 49 receive centrifugal force and engagement reaction from the pinion gears 39. The engagement reaction is produced by engagement of the pinion gears 39 with side gears 41 and 43.

Respective side gears 41 and 43 have bosses 51 and 53 rotatably supported to the support portions 55 and 57 formed to the cover 25 and the casing body 23. The bosses 51 and 53 are splined to the axles connected to the left and right wheels, respectively. The left side gear 41 and the differential casing 21 have an annular thrust washer 59 located therebetween. The right side gear 43 and the differential casing 21 have thrust washers 61 located therebetween. The thrust washers 59 and 61 receive the engagement reaction from the side gears 41 and 43, respectively.

Figure 2:
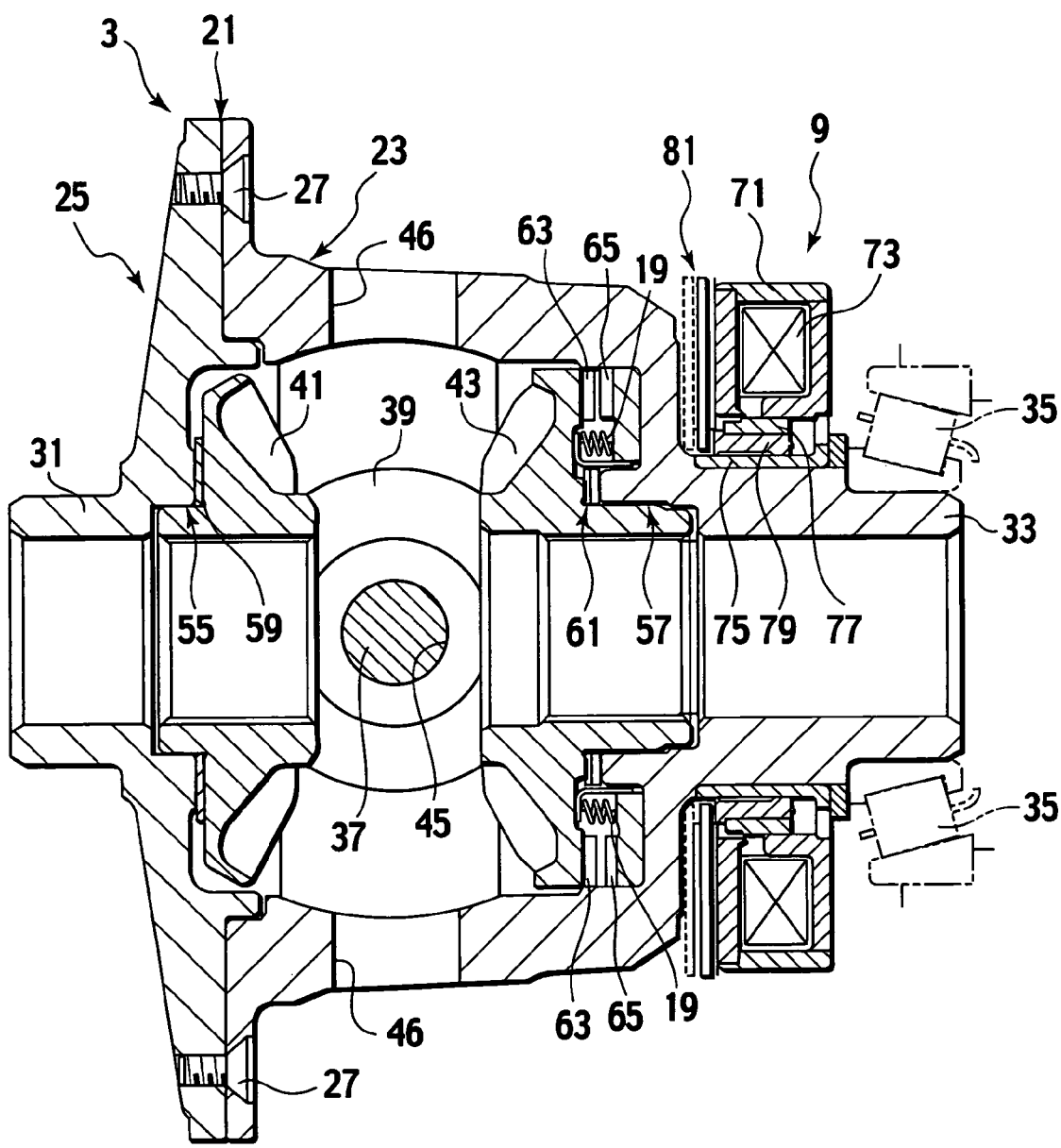
FIG. 2 is a sectional view of the differential that is rotated at 90° from one in FIG. 1.

The dog clutch 7 includes an engagement tooth 63 formed to the right side gear 43. The dog clutch 7 includes an engagement tooth 65 formed to the clutch ring 13. The clutch ring 13 has legs 67 through the openings 69 of casing body 23. The legs 67 are stopped from rotation by the differential casing 21 and are located to axially move. As illustrated by FIG. 2, when the clutch ring 13 moves leftward, the dog clutch 7 is engaged to lock the differential mechanism 5 with differential rotation. As illustrated by FIG. 1, the clutch ring 13 returns rightward to disengage the dog clutch 7 for releasing the differential lock.

The return spring 19 is located between the right side gear 43 and the clutch ring 13 to bias clutch ring 13 rightward toward the position where dog clutch 7 disengages.

Firstly, the functional idea of the electromagnetic actuator 1 is described. Energization of the electromagnet 9 allows the electromagnetic actuator 1 to produce force for actuating the clutch ring 13. This, it is a choice matter relative to design whether the energization of electromagnet 9 allows the clutch ring 13 to be directly actuated or to be indirectly actuated using an intermediate. Next, the constitution of the electromagnetic actuator 1 is described. The electromagnetic actuator 1, as illustrated in FIG. 1, includes an electromagnet 9, an ECU 11, a position switch 15, differential-lock actuation switch 17 (hereinafter referred to as an actuation switch).

The electromagnet 9, as illustrated in FIG. 1, includes an electromagnetic coil 73 housed in a magnetic coil housing 71. The electromagnet 9 includes a non-magnetic guide member 75, a magnetic plunger 77, and a non-magnetic slide ring 79. The coil housing 71 is fixed to the differential carrier 29 in the rotation direction using a link member for stopping from rotation. The guide member 75 is welded to the inner periphery of the coil housing 71. The guide member 75 is axially positioned between the boss 33 of the casing body 23 and the taper roller bearing 35. The plunger 77 is fixed to the outer periphery of the slide ring 79. The plunger 77 constitutes a magnetic flux loop with the coil housing 71 during energization of the coil 73 to move in the axial direction. The plunger 77 and the slide ring 79 are located between the inner periphery of the coil housing 71 and the outer periphery of the guide member 75. The inner periphery of the slide ring 79 is supported by the outer periphery of the guide member 75 to be axially movable.

The electromagnet 9 is excited into a first state to actuate the clutch 7. The electromagnet 9 is exited into a second state to hold, against the return spring 19, the clutch 7 actuated.

The clutch ring 13 to be rotated has legs 67 that are connected to the pressure plate 81 by the arm 83 on the inner peripheral side and that are opposed to the stationary slide ring 79. The pressure plate 81 is axially moved integrally with the clutch ring 13 under energization of the electromagnet coil 73. The clutch ring 13 is pressed by a return spring 19 under biasing force to bias the slide ring 79 (or plunger 77) rightward using the pressure plate 81.

The return spring 19 serves as a delay mechanism for the clutch 7 to be prevented from rapid engagement. That is, if the clutch ring 13 moves in the axial direction when the dog clutch 7 does not smoothly engage, the return spring 19 allows the end of the engagement tooth 65 formed to the clutch ring 13 and the end of the engagement tooth 63 formed to the side gear 43 to be abutted each other until the clutch ring 13 turns engageable. The return spring 19 allows both the ends to be bufferingly biased to each other for relative rotation, thus delaying the engagement of the dog clutch 7 until the dog clutch 7 turns into engageable state, without the clutch ring 13 and the side gear 43 rotating integrally with each other with the dog clutch 7 incompletely engaged.

The ECU 11, as illustrated in FIG. 3, includes a power circuit 85, and a CPU 87 (central processing unit). The ECU 11 includes an electromagnet driver 89 as a driving circuit for electromagnet 9 (electromagnetic coil 73). The ECU 11 includes a current monitor circuit 91, a switch input circuit 93, a hold transition timer T1 (hereinafter referred to as a timer T1), and an excitation limit timer T2 (hereinafter referred to as a timer T2). The ECU 11 includes a communication circuit 99 with another ECU that serves as an interface with an external The power circuit 85 converts the supplied battery voltage (Vcc) into a predetermined voltage for stabilization to supply voltage (VIGN) to the ignition-side through a connector. The CPU 87 connects to an electromagnet driver 89, a current monitor circuit 91, a switch input circuit 93, the timer T1, the timer T2, and the communication circuit 99 with another ECU. The CPU 87 is driven by the battery voltage (Vcc).

The electromagnet driver 89 is controlled by the CPU 87. The electromagnet driver 89 supplies a solenoid current from the power circuit 85 to the electromagnet 9 (or electromagnetic coil 73) connected thereto using the upstream connector for actuation. The solenoid current includes an excitation current; and a hold current smaller in magnitude than the excitation current. The excitation current excites the electromagnet 9 into the first state. The hold current excites the electromagnet 9 into the second state. The current monitor circuit 91 monitors, with the current detection resistance 101, the value of the solenoid current through the electromagnet 9 (or electromagnetic coil 73) connected thereto using the downstream connector to feed back the value of the solenoid current to CPU 87.

The current detection resistance 101 and the upstream connector-side for the electromagnet driver 89 have a diode 103 connected therebetween for measures against a reverse electromotive voltage. The diode 103 prevents reverse current.

The switch input circuit 93 incorporates therein three voltage conversion units 105, 107 and 109 that detect voltage variation in comparison with a battery voltage (Vcc). The voltage conversion units 105 and 107 connect to the on-side terminal and the off-side terminal of the actuation switch 17 using an on-connector and an off-connector, respectively. The voltage conversion units 105 and 107 feed back to the CPU 87 the signal that the actuation switch 17 turns on or off. The voltage conversion unit 109 monitors voltage variation depending on the position switch 15 turning on or off to be fed back to the CPU 87.

The communication circuit 99 with another ECU connects to a warning light control ECU 111. When the following failure is detected, the CPU 87 turns on the warning light to call for driver's attention.

The position switch 15, as illustrated in FIG. 1, is fixed through the differential carrier 29 using a screw. The probe 113 is opposed to the left side of the pressure plate 81 and is biased rightward by the return spring with an appropriate strength provided inside thereof. When the dog clutch 7 engages, the probe 113 moves leftward to the position indicated by the broken line. When the dog clutch 7 disengages, the probe 113 returns to the original position indicated by the solid line.

The detection object for the position switch 15 may include the clutch ring 13 itself, a member to move integrally with the clutch ring 13 or plunger 77.

If the electromagnet 9 is axially movable to directly move the clutch ring 13, the detection object may include the coil housing 71 of the electromagnet 9.

The position switch 15 may include a sensor that detects a detection object at a practical movement position, as shown by the contact type of the embodiment.

The position switch 15 is fitted to a stationary member such as the differential carrier 29. The position switch 15 may include a non-contact sensor, for example, a pulse sensor or a proximity switch that does not contact a movement member to detect the relative movement distance.

As another example, the detector 10 may be given variation in the number of rotations of a rotation shaft to estimate and judge the clutch engaged or disengaged.

The detector 10 may monitor variation in current through the electromagnet 9 to presume and judge the clutch engaged or disengaged depending on current variation value.

The detector 10 including the above sensors outputs a detection signal to the CPU 87.

The CPU 87 judges a current value depending on the detection signal.

For giving a current value, a PWM control may be used.

A signal is input into the CPU 87 from sensors that detect shift transmission of a transmission, the vehicle speed, the number of rotations in an engine, ABS, inclined manner of the vehicle or acceleration and so on. This achieves comprehensive actuator control The actuation switch 17 is located at the driver seat to be operated by the driver depending on need.

The timer T1 is set to a necessary delay time (t1) from actuation of position switch 15 to reduction of solenoid current to a hold current through the electromagnetic coil 73. When the position switch 15 is actuated, the timer T1 starts to count. For example, when the driver locks the differential 3 with differential during stopping and the delay time (t1) elapses, the solenoid current is switched to the hold current.

When the actuation switch 17 is actuated to supply the solenoid current (excitation current) to the electromagnetic coil 73, the timer T2 starts to count. The delay time (t1) elapses with the timer T1 so as to switch the solenoid current to the hold current, the timer T2 is reset.

The timer T2 is set to a predetermined delay time (t2). When the position switch 15 does not actuate though the time t2 elapses since the driver supports engagement of the dog clutch 7 (differential lock of differential mechanism 5) by the actuation switch 17, the timer T2 sends to the CPU 87 a signal notifying the matter.

Next, the operation of the differential 3 is described with reference to FIGS. 1 and 2.

The engine rotates the differential casing 21 using the transmission. Rotation of the differential casing 21 allows the differential mechanism 5 to be synchronously rotated. When the left and right axles provide a differential rotation therebetween, the pinion gear 39 is rotated to allow for relative rotation between the side gears 41 and 43. Here, the electromagnet 9 is energized to excite the electromagnetic coil 73, the plunger 77 is axially moved with the slide ring 79 toward the side gear43. The slide ring 79 presses against the pressure plate 81 toward the side gear 43, thus moving the clutch ring 1 to the side gear43. The clutch ring 13 abuts against side gear43 to mesh the teeth 63 and 65 with each other, thus engaging the dog clutch 7. The engagement of the dog clutch 7 stops the side gears 41 and 43 from relative rotation. Here, the probe 113 of the position switch 15 is axially moved by the pressure plate 81. When the probe 113 moves to the position corresponding to engagement of the dog clutch 7, the position switch 15 turns on.

While, when electromagnet 9 is stopped from energization to demagnetize the electromagnetic coil 73, the return spring 19 pushes back the clutch ring 13 to the original position, thus disengaging the dog clutch 7. The probe 113 returns to the original position by the return spring of the position switch 15.

Figure 5:
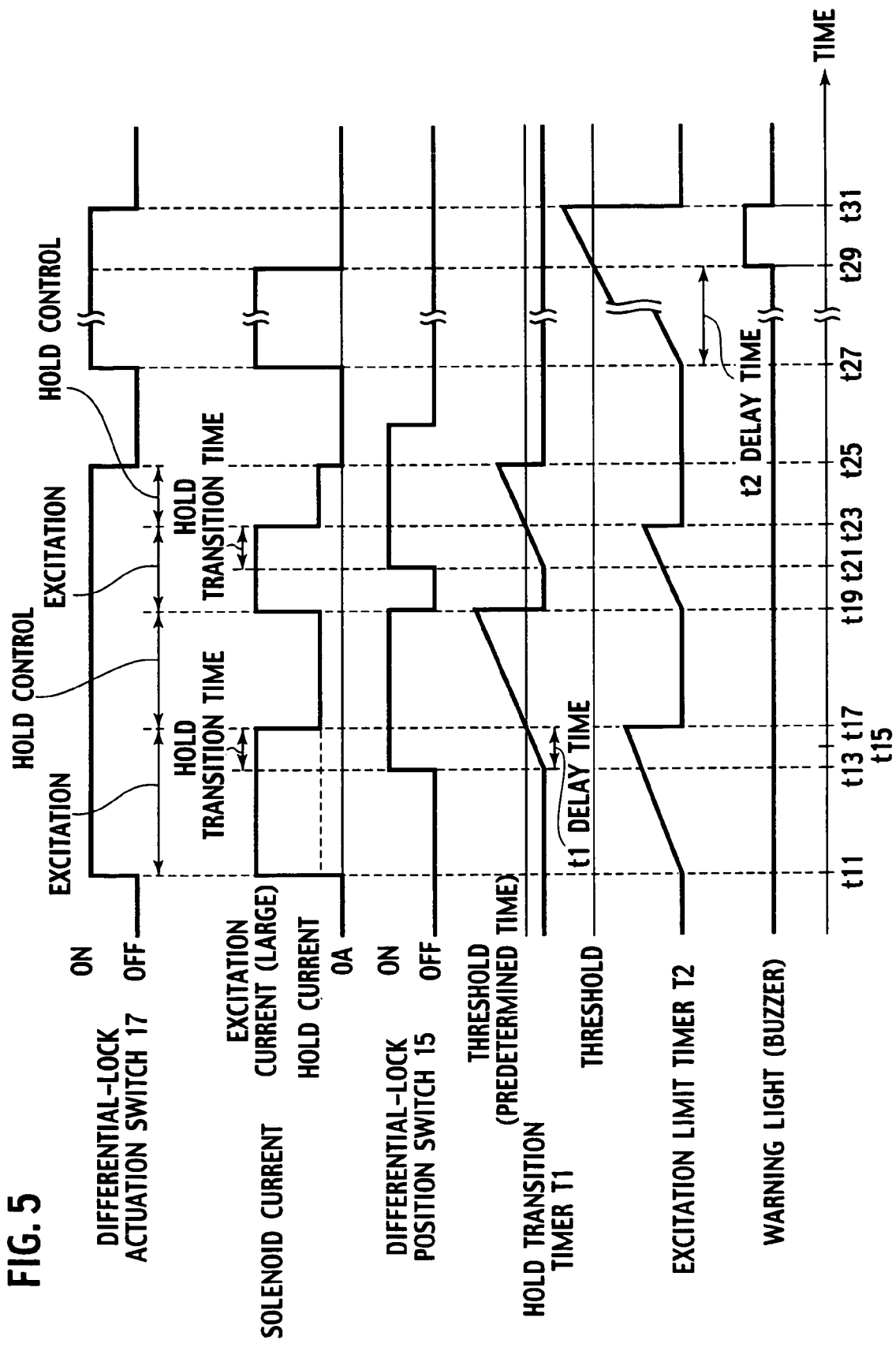
FIG. 5 is a timing diagram of current control for the electromagnet by the differential ECU.

Next, with respect to FIG. 5, the actuation switch 17, the electromagnetic coil 73, solenoid current, the position switch 15, the timer T1, the timer T2, the warning light (buzzer) are described about the controls.

At the timing t11 when the driver turns on the actuation switch 17, an excitation current is supplied to the electromagnetic coil 73 to be excited in the first state, the timer T2 starts to actuate. The electromagnet 9 allows the clutch ring 13 to be moved with the probe 113 toward the right side gear 43 for engaging the dog clutch 7.

Thereafter, at the timing t13 when engagement of the dog clutch 7 allows the probe 113 to be displaced form the original position at a distance, the position switch 15 turns on and the timer T1 starts to actuate.

Thereafter, at the timing t17, the timer T1 reaches the threshold. That is, when the delay time t1 elapses, the current through the electromagnet 9 is switched from the excitation current to the hold current, thus exciting the electromagnet 9 from the first state to the second state. At the identical time, the timer T2 is reset. This allows the electromagnet 9 to be shifted to a hold control. The hold control allows the clutch 7 to keep engaging against the return spring19.

At the timing t19 when the dog clutch 7 is disengaged so as to turn off the position switch 15, the excitation current is supplied to the electromagnet 9 again. At the identical time, the timer T1 is reset, and the timer T2 starts to actuate.

At the timing t21 when the dog clutch 7 is engaged so as to turn on the position switch 15, the control between the following timings t21 and t23 manipulates as the control between the timings t13 and t17 does.

At the timing t25 when the actuation switch 17 turns off, the electromagnet 9 is stopped from energization and the timer T1 is reset.

At the timing t27 when the driver turns on the actuation switch 17 again, the excitation current is applied to the electromagnet 9, and the timer T2 starts to actuate. While, the dog clutch 7 does not engage so as to fail to turn on the position switch T1, thus leaving timer T1 turned off.

Thereafter, the timer T2 reaches the threshold. That is, at the timing t29 when the delay time t2 elapses, the warning light turns on. The warning light provides the driver with a warning and calls for the driver's attention. The warning is that the dog clutch 7 does not engage so as to fail to lock differential, regardless of differential motion locked.

At the timing t31 when the actuation switch 17 turns off, the warning light turns off, and the timer T2 is reset.

Figure 4:
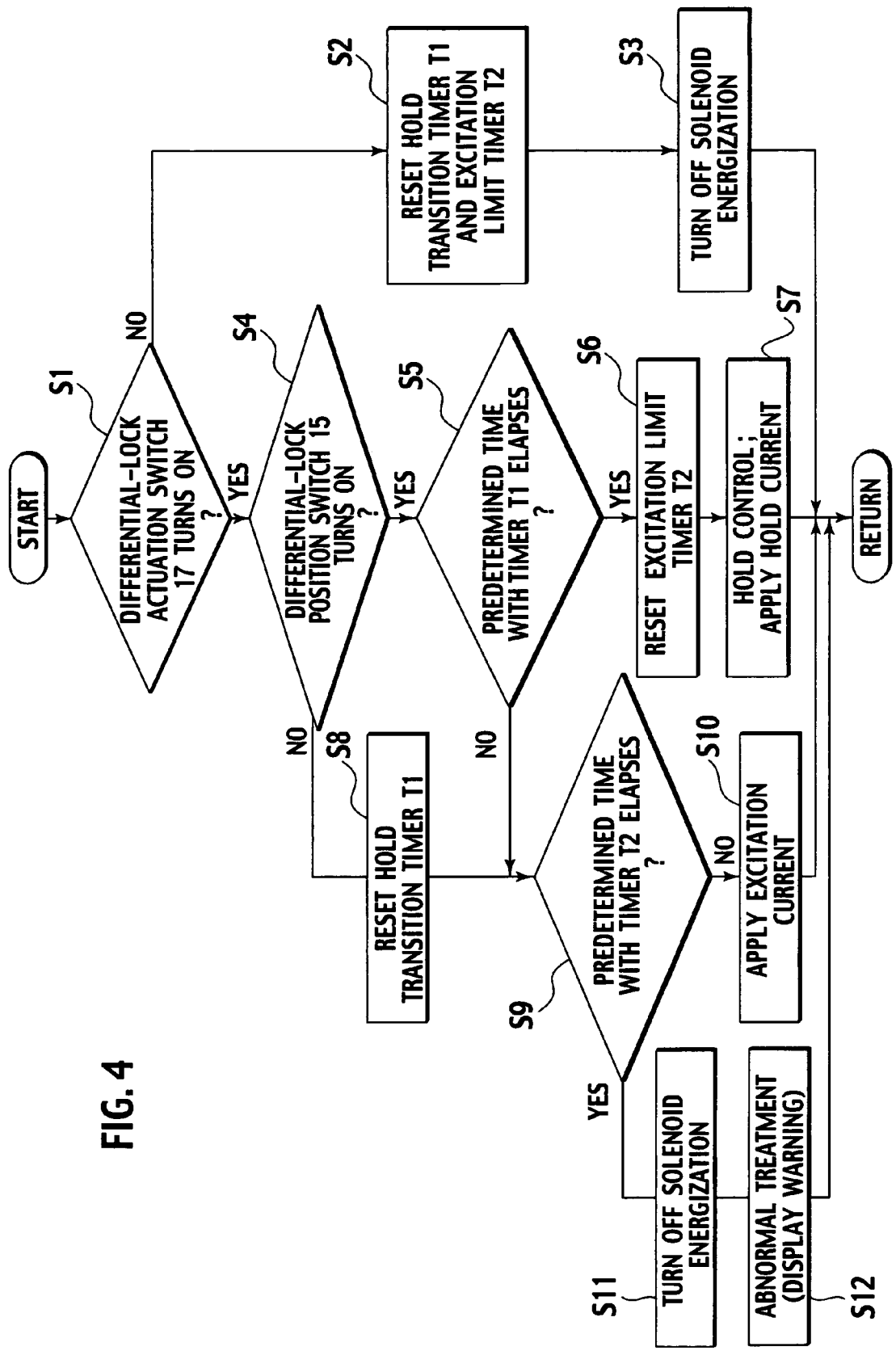
FIG. 4 is a flowchart illustrating a procedure of current control for an electromagnet by the differential-lock ECU.

With reference to the flowchart in FIG. 4, the ECU's 11 current control for the electromagnetic coil 73 is described.

The flowchart goes to the step S1, where with a signal from the voltage conversion units 105 and 107 of the switch input circuitry 93, it is judged whether the actuation switch 17 turns on or not. If the actuation switch 17 turns on, the excitation current is supplied to the electromagnet 9, the excitation timer T2 turns on. The flowchart goes to the step S4. If the actuation switch 17 does not turn on, the flowchart goes to the step S2.

The flowchart goes to the step S2, where the timers T1 and T2 are reset, and goes to the step S3.

At the step S3, the electromagnetic coil 73 is stopped from energization. The contents of the above steps S1 to S3 correspond to, for example, the control before the timing t11 and the control of timings t25 to t27.

The flowchart goes to the step S4, where it is judged whether the position switch 15 turns on or not, due to the actuation switch 17 turning on at the step S2. If the position switch 15 turns on, the flowchart goes to the step S5. If the position switch 15 does not turn on, the flowchart goes to the step S8.

At the step S8, though the excitation current has been supplied to the electromagnetic coil 73, the position switch 15 has not yet actuated. The timer T1 is reset, and the flowchart goes to the step S9.

At the step S9, elapsing time with the timer T2 is confirmed. That is, it is judged whether the delay time t2 elapses or not. If the delay time t2 does not elapse, the flowchart goes to the step S10. If the delay time t2 elapses, the flowchart goes to the step S11.

At the step S10, an excitation current is supplied to the electromagnetic coil 73, and the flowchart goes to the return. The above steps S8 to S10 correspond to the control between timings t11 and t13 and the control between the timings t19 and t21.

The flowchart goes to the step S5, where elapsing time with the timer T1 is confirmed. That is, it is judged whether the delay time t1 elapses or not. If the delay time t1 elapses (or the shift condition to the hold current is completed), the flowchart goes to the step S6. If the delay time t1 does not elapse, the flowchart goes to the step S9.

The shift from the step S5 to the step S9 and the contents of step S10 correspond to controls between the timings t13 and t17, for example, the timing t15 and between the timings t21 and t23.

The flowchart goes to the step S6 where with the delay time t1 elapsing, and the timer T2 is reset.

The flowchart goes to the step S7, where with the conditions completed at the step S5, the excitation current supplied to electromagnetic coil 73 is reduced to the hold current that is necessary and sufficient for the dog clutch 7 to be engaged against the return spring 19. The contents of the steps S6 and S7 correspond to the control of the timings t11 and t23.

The flow chart goes to the step S9 where the delay time t2 with the timer T2 elapses. Thereafter, the flowchart goes to the step S11 where the electromagnetic coil 73 is stopped from energization, and goes to the step S12.

At the step S12, in response to the timer T2 with the delay time t2 elapsing, the warning light control ECU 111 turns on the warning light (or actuates the warning buzzer) through the communication circuit 99 with another ECU.

Thereafter, the flowchart goes to the return. The above contents of the steps S9, S11 and S12 correspond to the control of timings t27 to t31.

Thereafter, the ECU 11 repeats the above steps from the start to the return at a predetermined period (frequency).

The electromagnetic actuator 1 achieves the following benefits.

The position switch 15 is used to detect the substance of switching in the dog clutch 7, so that the ECU 11 controls the solenoid current through the electromagnetic coil 73. According to the control, the ECU 11 precisely judges the dog clutch 7 engaged, differently from the related example. The judgment prevents the error that the solenoid current is reduced to the hold current before practical engagement of the dog clutch 7, thus preventing the incapability of engagement in the dog clutch 7 due to shortage of actuation force.

Thus, for preventing the shortage of actuation force, there is not any need to keep supplying excitation current to the electromagnetic coil 73, thus preventing the current consumption and heat generation from increasing. There is not any need to normally supply an excitation current, which does not need to enlarge the electromagnetic coil 73 for reducing solenoid current (or excitation current). This prevents the differential 3 from enlargement and reduction in layout and vehicle mountability.

Use of the position switch 15 as an inexpensive detector allows for inexpensive operation.

The timer T1 is set to a predetermined delay time (t1) from detection of the substance of switching in the dog clutch 7 to reduction of the solenoid current to the hold current through the electromagnetic coil 73. The delay time t1 allows for more precise judgment on the dog clutch 7 engaged.

Thus, the excitation current is applied to the magnetic coil 73 only when the clutch 7 engages, and is thereafter reduced to the hold current. The reduction provides setting of a higher excitation current, thus allowing electromagnetic coil 73 and differential 3 to be smaller and lighter.

Setting of the higher excitation current allows for chattering on the dog clutch 7 to be quickly converged.

The electromagnetic actuator of the invention may employ a delay mechanism such as a spring to transmit actuation force from the electromagnetic coil 73 to the dog clutch 7.

The delay mechanism is used to suppress the chattering to securely engage the dog clutch 7.

The delay mechanism reduces noise due to the chattering and abrasion, and durability deterioration of the engagement teeth 63 and 65.

Specifically, the electromagnetic actuator of the invention sets a predetermined delay time (t1) to reduce the solenoid current to the hold current.

The delay time (t1) may be changed according to a delay time of the delay mechanism, thus allowing a different system (a combination of a clutch and a delay time each having a different specification) to be adjusted so as to precisely detect a timing to switch the solenoid current to the hold current.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. An electromagnetic actuator comprising:
   an electromagnetic coil configured to provide actuation force, in accordance with a solenoid current to be supplied, to a clutch and configured to actuate the clutch to control relative rotation between first and second members;
   a detector configured to detect a connection state of the clutch to produce a detection signal; and
   a controller configured to respond to the detection signal from the detector to control the solenoid current from a first level to a second level after a delay following the start of the connection state.

2. The electromagnetic actuator according to claim 1, further comprising:
   an actuation member movable by the electromagnetic coil to actuate the clutch,
   wherein the detector comprises a position switch to detect the actuation member moved to actuate the clutch.

3. The electromagnetic actuator according to claim 2, further comprising:
   a resilient member configured to return the actuation member to an original position.

4. A differential comprising:
   first and second members rotatable relative to each other;
   a clutch engageable to connect the first and second members; and
   an electromagnetic actuator configured to actuate the clutch, the electromagnetic actuator comprising:
      an electromagnet configured to be excited into a first state to actuate the clutch and a second state to hold the clutch actuated in a connection state;
      a detector configured to detect the connection state of the clutch; and
      a controller configured to respond to the detector detecting the connection state of the clutch by changing the electromagnet from the first state to the second state after a delay following the start of the connection state.

5. The differential according to claim 4,
   wherein the clutch comprises a clutch member connected to one of the first and second members and movable by the electromagnet between a first position and a second position,
   wherein the clutch member disengages the clutch at the first position and engages the clutch at the second position,
   wherein when the detector detects the clutch member moved between the first and second positions to provide a detection signal, the controller responds to the detection signal by changing the electromagnet from the first state to the second state.

6. An electromagnetic clutch comprising:
   a clutch engageable to connect a first member and a second member rotatable relative to each other; and
   an electromagnetic actuator configured to actuate the clutch;
   the electromagnetic actuator comprising:
      an electromagnet configured to be excited into a first state to actuate the clutch and a second state to hold the clutch in a connection state;
      a detector configured to detect the connection state of the clutch; and
      a controller configured to respond to the detector detecting the connection state of the clutch by changing the electromagnet from the first state to the second state after a delay following the start of the connection state.

7. The electromagnetic clutch according to claim 6,
   wherein the clutch comprises a clutch member connected to one of the first and second members and movable by the electromagnet between a first position and a second position,
   wherein the clutch member disengages the clutch at the first position and engages the clutch at the second position,
   wherein when the detector detects the clutch member moved between the first and second positions to provide a detection signal, the controller responds to the detection signal by changing the electromagnet from the first state to the second state.

8. An electromagnetic actuator comprising:
   an electromagnet configured to be excited into a first state to actuate a clutch and a second state to hold the clutch in a connection state for controlling a relative rotation between first member and a second member;
   a detector configured to detect the connection state of the clutch; and
   a controller configured to respond to the detector detecting the connection state of the clutch by changing the electromagnet from the first state to the second state after a delay following the start of the connection state.

9. The electromagnetic actuator according to claim 8,
   wherein the clutch comprises a clutch member connected to one of the first and second members and movable between a first position and a second position by the electromagnet,
   wherein the clutch member disengages the clutch at the first position and engages the clutch at the second position,
   wherein when the detector detects the clutch member moved between the first and second positions to provide a detection signal, the controller responds to the detection signal by changing the electromagnet from the first state to the second state.

10. The electromagnetic actuator according to claim 9,
    wherein the detector measures position of the clutch member.

11. The electromagnetic actuator according to claim 8,
    wherein the first and second members comprise first and second differential rotation members for a vehicle differential,
    wherein the clutch controls differential rotation between the first and second differential rotation members.

* * * * *